United States Patent [19]

Bonin et al.

[11] Patent Number: 4,541,026
[45] Date of Patent: Sep. 10, 1985

[54] HYBRID READ-WRITE HEAD FOR PERPENDICULAR RECORDING MEDIA

[75] Inventors: Wayne A. Bonin, Cedar; Matthew P. Dugas, Minneapolis, both of Minn.

[73] Assignee: Vertimag Systems Corporation, Minneapolis, Minn.

[21] Appl. No.: 400,078

[22] Filed: Jul. 20, 1982

[51] Int. Cl.³ .......................... G11B 5/27; G11B 5/28; G11B 5/20; G11B 5/16

[52] U.S. Cl. .................................. 360/121; 360/123; 360/126; 360/127

[58] Field of Search ............... 360/131, 134, 135, 121, 360/119, 125, 110, 55, 120, 127, 118; 428/212, 900; 427/131, 132; 365/133

[56] References Cited

U.S. PATENT DOCUMENTS

| 4,210,946 | 7/1980 | Iwasaki | 360/131 |
| 4,251,842 | 2/1981 | Iwasaki | 360/134 |
| 4,276,574 | 6/1981 | Baasch | 360/121 |
| 4,277,809 | 7/1981 | Fisher | 360/110 |
| 4,287,544 | 9/1981 | Lazzari | 360/131 |
| 4,404,609 | 9/1983 | Jones | 360/126 |
| 4,418,472 | 12/1983 | Lorenze | 360/121 |
| 4,423,550 | 1/1984 | Fujioka | 360/121 |
| 4,458,279 | 7/1984 | Katz | 360/123 |

FOREIGN PATENT DOCUMENTS 0013363 7/1980 European Pat. Off. .
2813193 10/1978 Fed. Rep. of Germany .

OTHER PUBLICATIONS

Patent Abstracts of Japan-P 1828-vol. 4, #66(P-11) [548] May 17, 1980.

Primary Examiner—Robert M. Kilgore
Attorney, Agent, or Firm—Jacobs & Jacobs

[57] ABSTRACT

A hybrid read/write head for use with a perpendicular recording medium is a laminate of prefabricated members having thin film magnetic layers as the read/write and tunnel erase pole tips.

16 Claims, 7 Drawing Figures

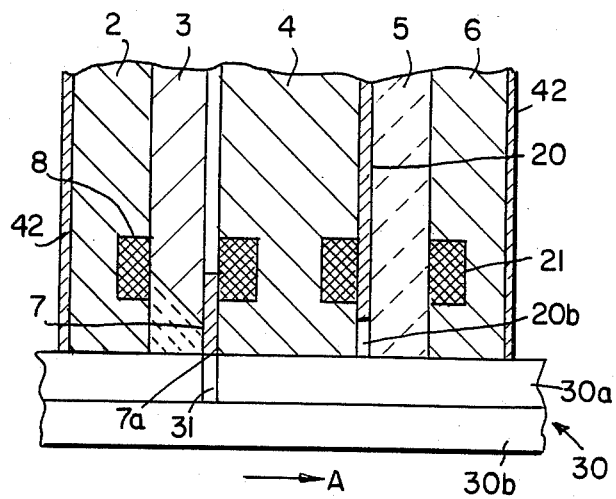
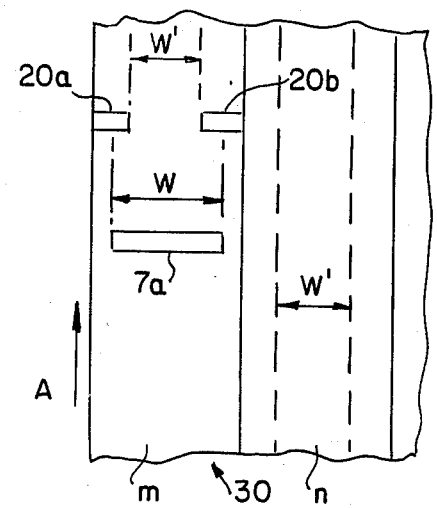
FIG. 4
FIG. 6
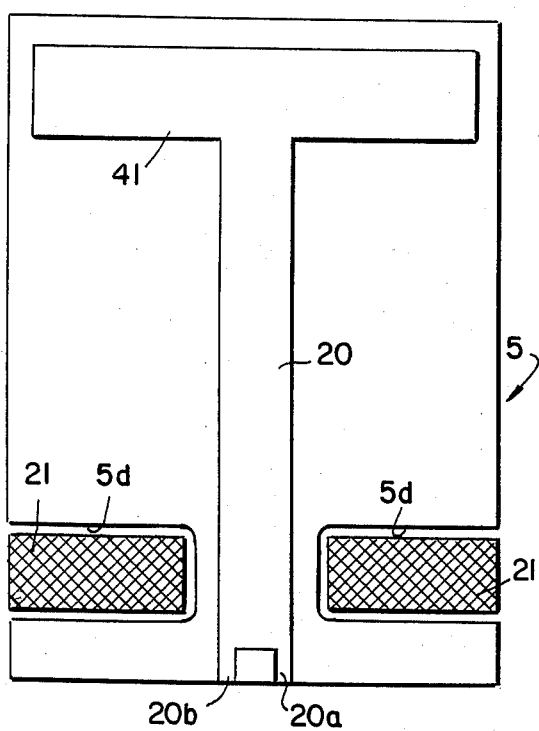
FIG. 5
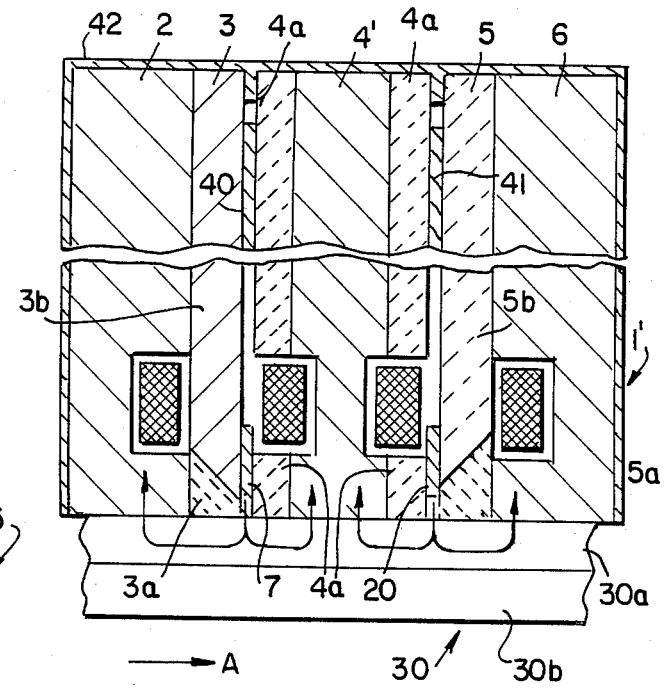
FIG. 7

HYBRID READ-WRITE HEAD FOR PERPENDICULAR RECORDING MEDIA

The present invention relates to a read/write head for use in perpendicular recording.

In conventional magnetic recording media, data are recorded by magnetizing the magnetic layer of the medium in a longitudinal direction parallel to the direction of relative movement between the magnetic medium and the transducer, or head, positioned adjacent to the medium. In perpendicular recording, data are recorded by magnetizing the magnetic recording layer in the direction perpendicular to the surface of the medium.

Magnetic recording transducers generally fall into two classes: ring-type heads that employ a ring having a gap therein and single pole-piece heads that employ an elongated rod or strip to link the magnetic flux being sensed by the head with an operatively associated coil. In ring-type heads, the resolution of the head is a function of the length of the gap, whereas in single-pole piece heads, the resolution is a function of the thickness of the pole-piece at its tip.

Ring-type heads have long been used in longitudinal recording and they have also been proposed for use in perpendicular recording. However, since a major advantage of perpendicular recording is the ability to read and write data at high density, the use of ring-type heads in perpendicular recording is not advantageous because the broad pulse widths obtained with ring-type heads lead to peak shift problems at high densities. Further, ring-type heads provide assymetric pulse shapes and, in general, give rise to difficulties in reading and writing at ultra high densities. Furthermore, ring-type heads cannot be used with all perpendicular recording media.

Single pole-piece heads offer the advantage of high resolution if the pole-piece is made by thin film deposition techniques. With thin film deposition, pole-pieces of less than one micron thick can be easily obtained, which would enable the head to read information stored at very high densities. However, there has not yet been any commercially acceptable method of making and using a thin-film, single pole-piece head for perpendicular recording.

While there have been many proposals in the patent literature of single pole piece heads for perpendicular recording, such as by Iwasaki and his co-workers, we are aware of no commercially available head of that type. Further, the Iwasaki et al patents, such as U.S. Pat. Nos. 4,210,946 and 4,251,842, are diagrammatic and do not purport to set forth a ready-to-use device.

We have now found that a single-sided read-write head for use with a perpendicular recording medium can be fabricated on a practical basis, and can be handled and used under normal use conditions without special precautions, if the head is formed as a laminate of a plurality of members, a face of one such member carrying read-write means including a thin film layer of magnetic material as the read-write pole piece.

We have also found that the read-write head may be provided with tunnel erase capability by providing the face of another of the members of the laminate with tunnel erase means including a thin film layer of magnetic material as the erase pole piece.

The present invention is illustrated in terms of its preferred embodiment in the accompanying drawing, in which:

FIG. 4 is a diagrammatic view of the head in use;

FIG. 5 is an elevational view of the member carrying the erase means of the head;

FIG. 6 is a diagrammatic view of the writing and erase techniques of the present invention; and FIG. 7 is a view similar to FIG. 4 of another embodiment of the invention.

Figure 1:
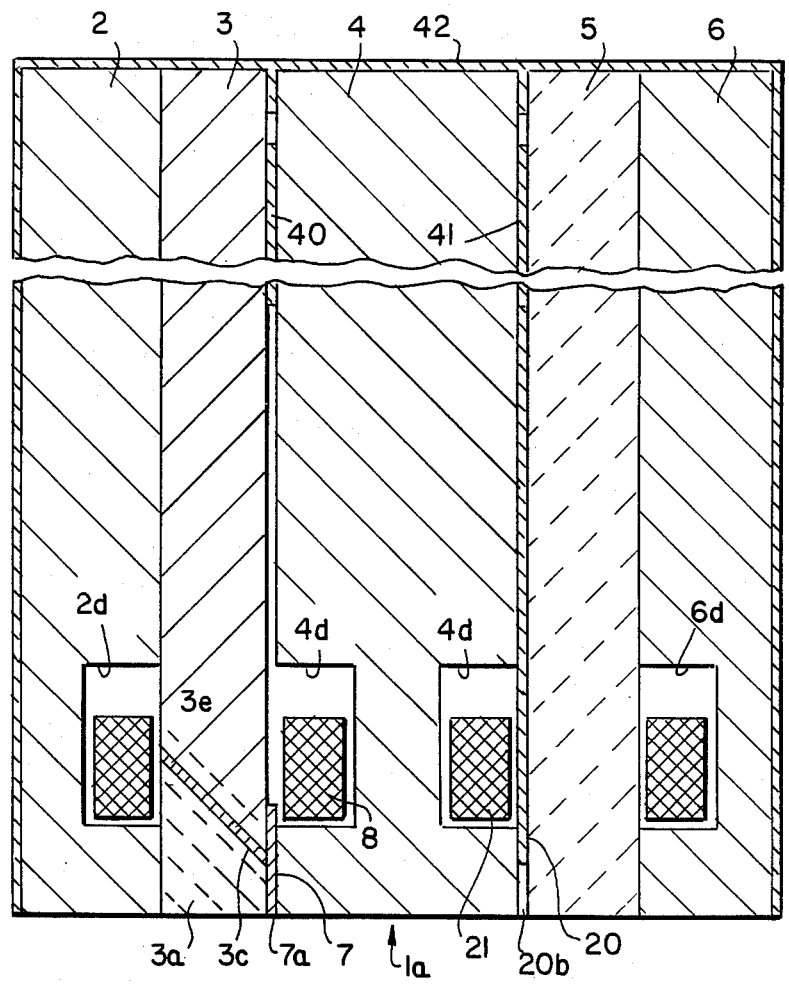
FIG. 1 is an elevational view, in section, on a greatly enlarged scale, of the read-write head according to the invention.

Referring to the drawings, FIG. 1 shows the read-write head 1 of the invention. Head 1 comprises elongated prefabricated members 2, 3, 4, 5 and 6 secured together in face-to-face relationship. In the embodiment shown, each of members 2, 4 and 6 is of uniform cross-section from edge-to-edge and member 2 is preferably the mirror image of member 6.

As will be discussed in detail hereinafter, member 3 carries a layer 7 of magnetic material which together with electrical coil 8 forms the means for reproducing and recording information on a perpendicular recording medium. Member 5 carries a layer 20 of magnetic material which together with electrical coil 21 forms a tunnel erase device. Member 4 is a spacer while members 2 and 6 are support members. Collectively, they provide structural integrity to the unitary heat structure 1. As shown in FIG. 1, member 2 is made of a magnetic material such as a ferrite, while members 4, 5 and 6 are made of a nonmagnetic material such as silica, sapphire or barium titanate. (FIG. 7 shows another embodiment where members 2, 4' and 6 are magnetic.) In use, the lower end 1a of head 1 is positioned proximate to and in close contact with the recording medium.

Figure 2:
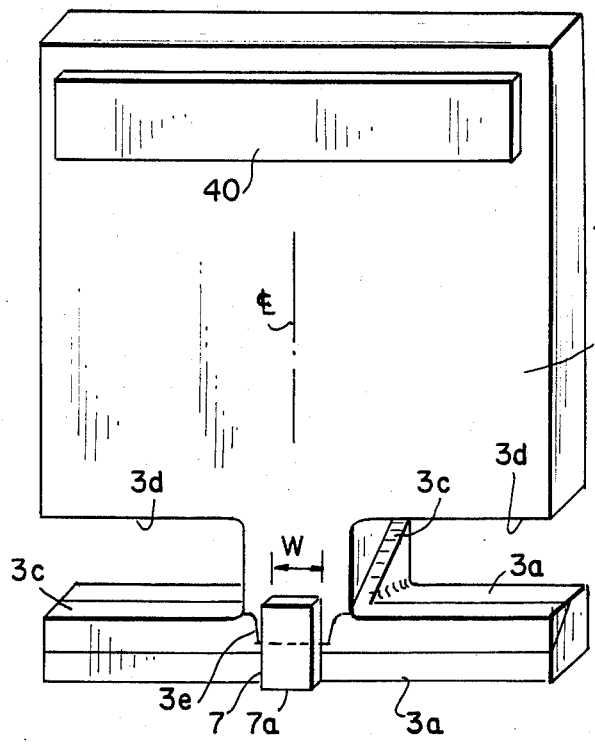
FIG. 2 is a view in perspective of the member carrying the read-write pole piece of the head.
Figure 3:
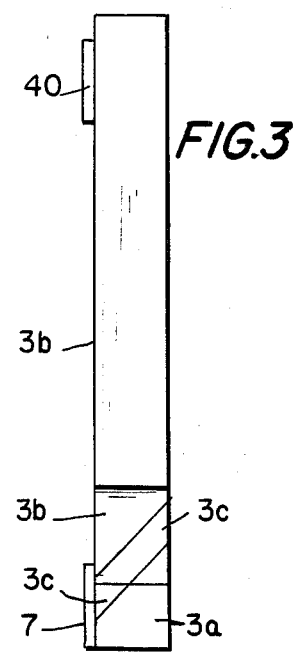
FIG. 3 is an end view of the member of FIG. 2.

FIGS. 1-3 illustrate member 3, with FIGS. 2 and 3 isolating member 3 for simplicity of presentation. Thus, member 3 has a layer 7 of magnetic material, such as Permalloy, deposited thereon as a thin film by sputtering and formed into the desired pattern by lithographic techniques. Wound around the lower end 3a of layer 3 is an electrical coil 8 (FIG. 1) of an electrical conductor. Coil 8 is positioned within slots 2d, 3d and 4d, and is preferably a center-tap coil providing twice as many turns for reading as for writing, such as 100 and 50, respectively. Lower end 3a of member 3 is made of a non-magnetic material, such as a ceramic, sapphire or barium titanate, while the upper portion 3b is made of a magnetic material, such as a ferrite. Portions 3a and 3b are joined together by means of a layer 3c of glass that is fused to portions 3a and 3b.

Member 3 is formed by cutting parallel grooves into the top of a blank made of magnetic material to leave a series of spaced apart, parallel ridges. A blank of a non-magnetic material is placed over the ridges, with a thin layer of glass sandwiched between the two blanks. When the glass is fused, it will bond the two blanks together and fill in the grooves. With the bonded blanks disposed so that the ridges lie in a horizontal plane, a plurality of sub-units are sliced off by a diamond saw making an angle of about 45° with the horizontal, the cutting plane intersecting the plane containing the ridges in a line perpendicular to the ridges. The sub-units are then cut into a plurality of members each containing one ridge, which are squared off to provide member 3. The dotted line in FIG. 1 shows a ridge 3e bonded to part 3a via fused glass layer 3c. The final step is to cut the slots 3d (FIG. 2).

Layer 7 and magnetic portion 3b functions as the reading or writing pole-piece of the read-write head 1, and layer 7 itself terminates in a pole-tip end 7a. Since the portion 3a of member 3 adjacent pole-tip end 7a is nonmagnetic, as is also true of member 4, the thickness of layer 7 at the pole tip end 7a is operable to establish the resolution of head 1 when head 1 is used for reading. With thin film deposition techniques, layer 7 can be deposited in a thickness of 1 micron or less, and a thickness of 0.5 micron has been found suitable.

As diagrammatically shown in FIG. 4, read-write head 1 according to the invention is used by disposing end 1a adjacent to a suitable rigid or flexible perpendicular magnetic medium 30 with the end 1a separated from medium 30 by only a small film of air or lubricant of at most 0.1 micrometers thick, and with the width, W, (FIG. 2) of pole-tip end 7a within a track of medium 30. The medium 30 has an upper layer 30a of a magnetic material and a support layer 30b, and moves relative to head 1 in the direction of arrow A.

When head 1 is used for writing, an electric current is applied to coil 8 and a magnetic field is thus generated by coil 8 having its maximum flux density through the pole piece perpendicular to medium 30. This will magnetize a cell 31 of medium 30 up or down, depending on whether the sign of the field is negative or positive.

In accordance with standard digital recording, data is contained in medium 30 as the presence or absence of a transition in magnetization at specified locations or times. With head 1, data is recorded by reversing the write current supplied to coil 8 at the appropriate times. Since recording is a trailing edge phenomenon, wavelengths smaller than the thickness of pole-tip end 7a can be recorded. As is known, perpendicular recording creates narrow transitions between cells, thereby allowing for high density digital recording.

When head 1 reads the magnetic information stored in medium 30, one need only detect the electrical voltage produced in coil 8 as the medium 30 moves relative to the pole-tip end 7a. The relative motion of the read fields with respect to the pole tip 7a create electrical pulses at each transition between cells of opposite magnetization.

During reading or writing, the magnetic circuit for the flux will include member 3b, layer 7 and cell 31 in upper layer 30a of medium 30, and the flux will travel through the air to form a closed path. To improve the efficiency of head 1, it is preferred that member 2 be made of a magnetic material, such as a ferrite, and that layers 30a and 30b be made of CoCr and Permalloy, respectively, as described in Iwasaki et al U.S. Pat. No. 4,210,946. Thus, the flux will now be confined in a closed path comprising member 3b, layer 7, cell 31 in layer 30a, underlayer 30b and member 2.

Head 1 is eminently suitable for reading information recorded at high density, since the resolution of head 1 during reading is established by the thin pole-tip end 7a. Thus at a thickness of 1 micron for layer 7 at pole-tip end 7a, head 1 is able to read information recorded at a density of 25,000 or more flux changes per inch while at 0.5 microns for pole-tip end 7a, the resolution will be 50,000 or more flux changes per inch, depending upon such factors as separation between pole tip and medium etc. The limiting factor is the sin x/x null that occurs when the wavelength equals the pole-tip thickness.

It is noted that member 3a is suitably about 15 mils thick, thus widely separating pole-tip end 7a from magnetic member 2. Furthermore, while pole-tip end 7a will be about 0.5 microns thick, more or less, member 2 will have a thickness of about 60 to 100 mils or more. Under these conditions, head 1 has only a single pole-piece because the pole-tip end 7a of the layer 7 of magnetic material is the point of maximum magnetic flux in the head for reading and writing. Furthermore, the resolution of head 1 when reading information recorded on a magnetic medium is a function of only the thickness of the pole-tip end 7a and is independent of the large distance between layer 7 and member 2.

FIG. 5 shows member 5 with coil 21 within slots 5d. Coil 21 also lies in slots 4d and 6d (FIG. 1) and is used to produce the erase field. Member 5 is preferably made of nonmagnetic material as shown, such as silica, sapphire or a ceramic such as barium titanate. Member 5 carries a layer 20 of magnetic material, such as Permalloy, deposited thereon as a thin film and patterned by lithographic techniques. Layer 20 serves as the erase pole-piece and terminates in a pair of spaced apart erase pole-tips 20a and 20b adjacent end 1a of head 1. As can be seen in FIG. 4, layer 20 is spaced downstream from layer 7, with respect to the direction of movement A of medium 30. Layer 20 presently has a preferred thickness of about 2 microns.

FIG. 6 diagramatically shows medium 30 passing under pole-tip end 7a and pole tips 20a and 20b. While head 1 is writing, a DC current is continuously applied to coil 21. After head 1 has written a band of information of width W in track m of medium 30, pole-tips 20a, 20b will erase the outermost edges of the written information so as to trim the width thereof to W', a width slightly less than the width of pole-tip end 7a. When head 1 is then used to read information written on a track n, slight misalignment of the head 1 will not result in cross-talk between adjacent tracks m and n, because any part of pole-tip end 7a that is outside the band of written information in track n will lie in the areas totally erased by pole-tips 20a, 20b. Pole-tip end 7a is thus prevented from simultaneously reading two adjacent tracks of recorded information.

The relative dimensions of layers 7 and 20 will depend upon the track density of the recording medium and the mechanical tolerances inherent in the particular disk drive and disks. For, example at a track density of 96 tracks per inch, the width, W, of layer 7 is suitably 8 mils. Correspondingly, pole tips 20a, 20b may be 3 mils wide on 9.5 mil centers.

Since part 3b (FIG. 3) is of magnetic material, layer 7 need only extend partly onto part 3b from the pole-tip end 7a; the magnetic portion 3b thus serving as an expansion of the read-write pole piece. If member 5 were made identically to member 3, then layer 20 would likewise need only extend a small distance away from the pole-tip ends, 20a, 20b instead of as shown.

An advantage of using the long magnetic expansion 3b for the read-write pole-piece, is to lower the reluctance away from the pole-tip end 7a and thereby maximize the flux linked by coil 8 when reading. The magnetic expansion 3b is suitably about ten times the length from the pole tip 7a to the center of coil 8. Thus, where the distance from the lapped pole tip 7a to the center of coil 8 is about 15 to 20 mils, the expansion 3b may be from about 150 to about 200 mils long.

If support member 6 is of non-magnetic material, as shown in FIG. 1, flux will return to layer 20 through underlayer 30b and hence through the air. To improve performance, it is preferred that member 6 be made of a magnetic material to provide a direct flux return path from underlayer 30b through member 6. FIG. 7 illustrates an embodiment where member 6 is made of a magnetic material, such as a ferrite, and the erase field and the read-write fields have symmetrical flux return paths. Thus, in FIG. 7, head 1' has a central member 4' made of a magnetic material, with a layer 4a of non-magnetic material, such as barium titanate, on both sides. Layer 4a may be about 2 mils wide, so that flux generated by the read-write magnetic fields will return through magnetic members 2 and 4', thus allowing some of the flux to return through underlayer 30b on both sides of layer 7 as shown by the arrows.

Member 5 appears in FIG. 7 as identical to member 3, with lower non-magnetic portion 5a and upper magnetic portion 5b, so that layer 20' may be of about the same length as layer 7. With member 6 made of magnetic material, the flux from the erase field will likewise have closed paths on either side of pole tips 20a, 20b.

If members 3 and 5 were made even thinner than the presently preferred 15 mils, then the flux return paths would be more symmetrical, thus enhancing the efficiency of the head by reducing the path length of the flux, thereby reducing the reluctance. However, as members 3 and 5 become very thin, as about 2–5 mils, they become more difficult to fabricate and process. Hence, the optimum thicknesses must be empirically determined.

The head 1 according to the invention is formed by first fabricating members 2–6 and then depositing layers 7 and 20. Shims 40 (FIG. 2) and 41 (FIG. 5) are used to keep members 3 and 5 parallel to member 4 and thus avoid imperfect lamination, and hence they should be of the same thickness as layers 7 and 20, respectively. This can be readily accomplished by forming the shims at the same time that layers 7 and 20 are formed. Thus, the magnetic material to be used for layer 7 or 20 is deposited over the member 3 or 5 and a single lithographic mask is used having a pattern for the shim and layer 7 or 20. When the excess magnetic material is etched away, the shim and layer 7 or 20 are simultaneously formed.

While it is convenient to use shims in the form of rectangular shims 40 and 41 extending transversely across members 3 and 5, respectively, other shim patterns could be used. For example, three or four small shims (not shown) could be symmetrically disposed on member 3 or 5, above coil 8 or 21, adjacent the edges thereof. All that is required is that the shim or shims cooperate with the layer 7 or 20 to keep members 3 and 5 parallel to member 4 during lamination.

Members 2 through 6 are secured together to form the unitary structure 1 by clamping the members together in the relationship shown in FIG. 1 using a spring clip of the type used for bonding standard floppy disk heads. A clamping force of about 1 pound is usually sufficient. To ensure good bonding, the mating faces of members 2 through 6 should be polished flat. An adhesive is then applied to the edges of the clamped members (except, of course, for the end 1a) and cured. The cured adhesive 42 (FIG. 1) forms a shell or case around the edges of the clamped members and fills the relatively large spaces between members 3, 4, and 4, 5 as well as the almost indetectable spaces between members 2, 3 and 5, 6. A suitable adhesive is Epon 820 adhesive with DTA hardener. Other epoxy resins can be used as well. If desired, the members 2–6 can be secured together by other means, as by external clamps. The nature of the epoxy resin and the clamping means is not critical. Any suitable means for securing the members together can be used.

It is preferred to fabricate members 2 through 6 slightly longer than is shown in FIG. 1, and then to lap the lower end (as seen in FIG. 1) to remove excess material. This will ensure that the end 1a has the desired contour and that the pole-tip end 7a and the pole-tips 20a, 20b are right at the end 1a. In a preferred embodiment, the portion of layer 7 that extends along part 3a from bond line 3c to end 1a is about ½ to about 3 mils long. Typical lapped contours include cylindrical, spherical and flat, all of which having been used successfully. The contour for a given application will be determined empirically to optimize the head-to-media interface.

What is claimed is:

1. A read-write head for use with a perpendicular recording medium, comprising prefabricated elongated members secured together in face-to-face relationship to form a unitary structure having an end adapted to be proximate to said recording medium during use, a first said member having a non-magnetic end portion adjacent said proximate end of said head and a magnetic portion extending away from said non-magnetic end portion, said head further comprising:
   (a) read-write means for selectively reproducing and recording information on said recording medium, comprising pole-piece means between said first member and a said member secured thereto and first electrical coil means in operative association with said pole-piece means, said pole-piece means comprising a first elongated thin film layer of a magnetic material carried by and extending longitudinally along a face of said first member, said first thin film layer overlying said non-magnetic end portion of said first member and extending onto said magnetic portion and having a pole-tip end immediately adjacent the non-magnetic end portion of said first member at said proximate end, the thickness of said pole-tip end being operable to establish the resolution of said head when said head is used for reproducing said information.

2. The head according to claim 1, further comprising
   (b) erase means for erasing the edges of a track of information recorded by said read-write means comprising a second elongated thin film layer of a magnetic material between two of said members, and second electrical coil means in operative association with said second thin layer of magnetic material, said second thin layer of magnetic material being carried by and extending longitudinally along a face of a second such member and terminating in a pair of pole-tips immediately adjacent to and spaced apart along the end of said second member at said proximate end; and
   (c) said pair of pole-tips of said erase means and said pole-tip end of said read-write means being spaced apart from one another along said proximate end.

3. The head according to claim 2, wherein said members include an internal spacer member and support members, said first and second members each being located between a said support member and said internal spacer member.

4. The head according to claim 3, wherein said second member is of a non-magnetic material, at least at the portion thereof adjacent said pole-tips.

5. The head according to claim 4, wherein said spacer member is of a non-magnetic material, said support member adjacent said first member is of a magnetic material, and said support member adjacent said second member is of a non-magnetic material.

6. The head according to claim 4, wherein said spacer member and said support members are of a magnetic material.

7. The head according to claim 6, wherein said first and second thin layers of magnetic material are each adjacent said magnetic spacer member, and said magnetic spacer member has a main portion made of a magnetic material and non-magnetic portions on each face thereof magnetically separating said thin layers from said main portion of said magnetic spacer member.

8. The head according to claim 5 or 6, wherein said second member is of a non-magnetic material.

9. The head according to claim 3, wherein said faces of said first and second members carrying said first and second thin layers of magnetic material also carry shim means for maintaining said first and second members substantially parallel to said spacer member.

10. The head according to claim 9, wherein said shim means are substantially the same thickness as the thin layers of magnetic material operatively associated therewith.

11. The head according to claim 3, including holding means for maintaining said members as a unitary structure.

12. A read-write head for use with a perpendicular recording medium, comprising first and second elongated prefabricated magnetic members secured together in face-to-face relationship to form a unitary structure having an end adapted to be proximate to said recording medium during use; pole-piece means between said first and second magnetic members; and first electrical coil means in operative association with said pole-piece means; said pole-piece means comprising an elongated thin film layer of magnetic material between and extending longitudinally along opposed faces of said first and second magnetic members and having a pole-tip end immediately adjacent the end of said magnetic members at said proximate end of said head, said first and second magnetic members having a non-magnetic portion at the end thereof adjacent said pole tip end; the thickness of said pole-tip end being operable to establish the resolution of said head when said head is used for reading; said first and second magnetic members being operable to provide flux return paths on both sides of said pole-piece means for flux generated by read-write magnetic fields.

13. The read-write head according to claim 12, wherein said members are transversely slotted adjacent said pole-tip end and said electrical coil means is wound around said pole-piece means and through said slots.

14. The read-write head according to claim 13, wherein said first member is comprised of a laminate of two elongated sub-members secured together in face-to-face relationship.

15. The read-write head according to claim 12, wherein said flux return paths are symmetrical.

16. The read-write head according to claim 13, wherein said flux return paths are symmetrical.

* * * * *